UNITED STATES PATENT OFFICE.

MARK W. SAMUEL, OF NEW YORK, N. Y.

METHOD OF AND MEANS FOR THE PRODUCTION OF FIGURES IN RELIEF ON VARIOUS SUBSTANCES.

SPECIFICATION forming part of Letters Patent No. 264,771, dated September 19, 1882.

Application filed June 23, 1882. (No specimens.)

*To all whom it may concern:*

Be it known that I, MARK W. SAMUEL, a citizen of the United States, and a resident of the city, county, and State of New York, have invented a new and useful Method of and Means for the Production of Objects in Relief on China, Porcelain, or any other Substance, of which the following is a specification.

The object of my invention is to produce figures in relief on china and porcelain in imitation of limoges, faience, and pallisier, and also to produce in relief figures in imitation of wood-carving, moldings, and castings, by the use of a certain composition in the manner and for the purposes described, and particularly with the process subsequently set forth.

The first step in my invention is the manufacture of the composition or plastic, which is done as follows: I take, in the first place, about forty-five per cent. of wax and heat the same until it melts. Powdered resin is then put in the melted wax to the amount of fifty per cent. These two ingredients are mixed well and allowed to boil until they are thoroughly mingled. I then pour into this mixture about five per cent. of Venice turpentine, and boil this mixture for about ten minutes. The mixture is then poured into trays or any suitable receptacle and allowed to cool. The color of the composition, when cooled, is brownish. This composition or plastic may be then softened by manipulation and the heat of the hand, and molded into any desired shape—such as the petals of a rose or any other figure—or it may be advantageous in some cases to obtain the form of the desired object in the following manner: The form is cut out of wire-gauze, thin metal, muslin, paper, leather, vegetable fiber, asbestus, mica, or similar substances, and on one or both sides of this form I place the composition made as described. I do not wish, however, to confine myself exclusively to the use of either of these methods of molding the plastic into the desired shape, as it may be advantageous on some occasions to use one or the other.

The method of placing the plastic composition on the substance and securing it there properly is as follows: After the plastic is molded into the desired shape by either of the foregoing methods it is immediately placed on the china or other substance for which it is intended, where it is adequately retained by its own adhesiveness, no glutinous substance being required. The plastic figure is then allowed to harden, and afterward is covered with a coat of calcimine or other similar composition, which I employ to harden the surface of the figure and protect it against indentation, as well as for the purpose of resisting the injurious results produced on the relief by extreme heat or cold. The plastic figure is then colored as desired with paint mixed with varnish, which latter substance is used to resist the absorptive powers of calcimine.

By the use of this substance in the manner described a perfect imitation of limoges, faience, and pallisier and wood-carving may be obtained.

What I claim, and desire to secure by Letters Patent, is—

1. The hereinbefore-described composition or adhesive plastic, which consists of wax, resin, and Venice turpentine in the proportions specified, produced substantially as described.

2. The process hereinbefore described of producing figures in relief on china, porcelain, and other substances in imitation of limoges, faience, wood-carving, moldings, and castings, which consists in forming the plastic composition above described into the desired shape by manipulation, or in cutting out the desired form from the materials heretofore described, and placing the plastic on one or both sides of the form, then in placing said figure on the article to be ornamented, and lastly, in coating the same with calcimine to harden its surface and to resist the influence of the atmosphere, substantially in the manner described.

3. The imitation of limoges, faience, and pallisier and wood-carving, moldings, and castings produced by the above-described plastic composition used in connection with the process hereinbefore described.

MARK W. SAMUEL.

Witnesses:
ELLIS S. YATES,
CHARLES DOEBELY.